US008267754B2

(12) United States Patent
Jamison

(10) Patent No.: US 8,267,754 B2
(45) Date of Patent: Sep. 18, 2012

(54) SKINNING KNIFE

(76) Inventor: John Richard Jamison, Eugene, OR (US)

( * ) Notice: Subject to any disclaimer, the term of this patent is extended or adjusted under 35 U.S.C. 154(b) by 0 days.

(21) Appl. No.: 13/327,665

(22) Filed: Dec. 15, 2011

(65) Prior Publication Data
US 2012/0156975 A1 Jun. 21, 2012

Related U.S. Application Data

(62) Division of application No. 12/142,699, filed on Jun. 19, 2008, now Pat. No. 8,152,606.

(51) Int. Cl.
*A22B 5/16* (2006.01)
(52) U.S. Cl. ....................................................... 452/125
(58) Field of Classification Search ........... 452/125–133
See application file for complete search history.

(56) References Cited

U.S. PATENT DOCUMENTS

| 1,546,975 | A | * | 7/1925 | Feller .............................. 30/286 |
| 2,974,411 | A | | 3/1961 | Little |
| 3,600,806 | A | | 8/1971 | Naccash |
| 4,607,432 | A | | 8/1986 | Montgomery |
| 4,763,416 | A | * | 8/1988 | Copeland ........................ 30/294 |
| 4,920,645 | A | | 5/1990 | Baudouin |
| 4,937,941 | A | | 7/1990 | Crist |
| 5,482,501 | A | * | 1/1996 | Frits .............................. 452/125 |
| 6,371,844 | B1 | * | 4/2002 | Holler ........................... 452/132 |
| 6,471,577 | B1 | * | 10/2002 | Hendrickson ................. 452/132 |
| 6,607,430 | B1 | * | 8/2003 | Navarette ...................... 452/105 |
| 6,722,969 | B2 | * | 4/2004 | Hendrickson ................. 452/132 |
| 7,003,884 | B2 | | 2/2006 | Perlmutter |
| 7,082,688 | B2 | | 8/2006 | Votolato |
| D548,024 | S | | 8/2007 | Trinque |
| 2003/0070298 | A1 | | 4/2003 | Ruiz |

* cited by examiner

*Primary Examiner* — Richard Price, Jr.
(74) *Attorney, Agent, or Firm* — Law Office of William A. Birdwell

(57) ABSTRACT

A skinning knife, comprising a handle, a slitting blade disposed at a forward portion of the handle and having an upwardly- and forwardly-directed cutting edge, a first spreading member disposed at the forwardmost position of the knife so as to spread apart two portions of animal hide that have been separated by the slitting blade, and a retractable punch blade disposed in the handle beneath slitting blade for opening a hole in the hide, the first spreading member having a slot therein for receiving the punch blade. A punch blade actuation mechanism is provided for moving the punch blade through the slot in the first spreading member. Preferably, a second spreading member disposed below and forward of the first spreading member is provided for facilitating entry into a small slit.

29 Claims, 3 Drawing Sheets

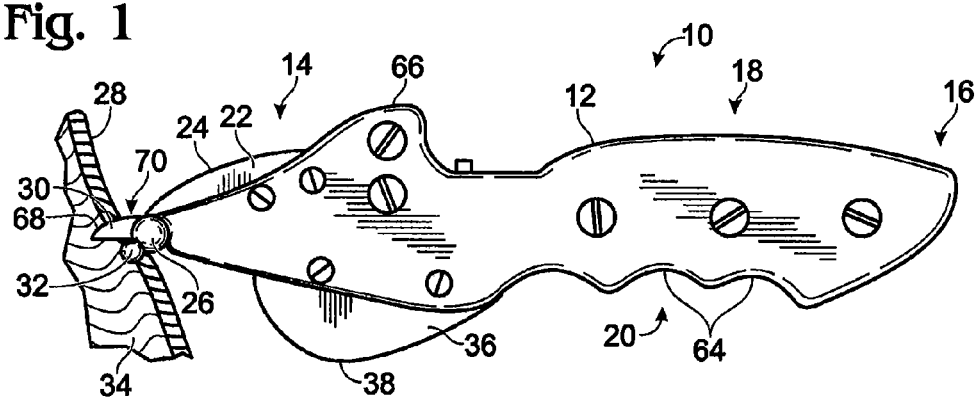
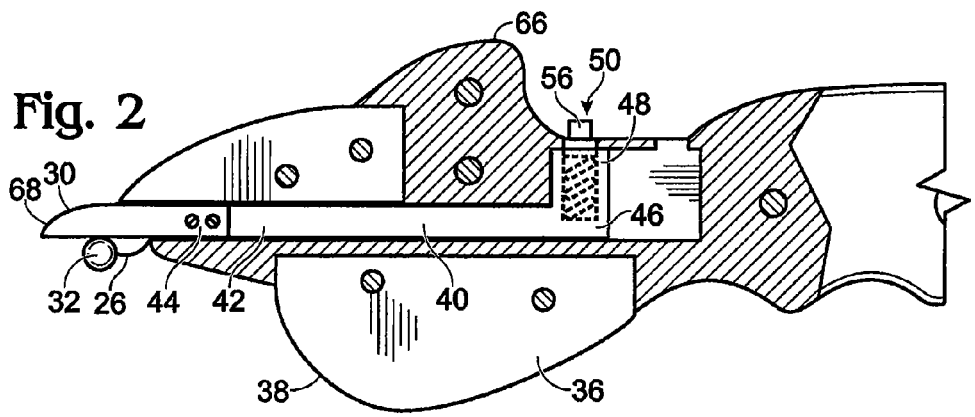
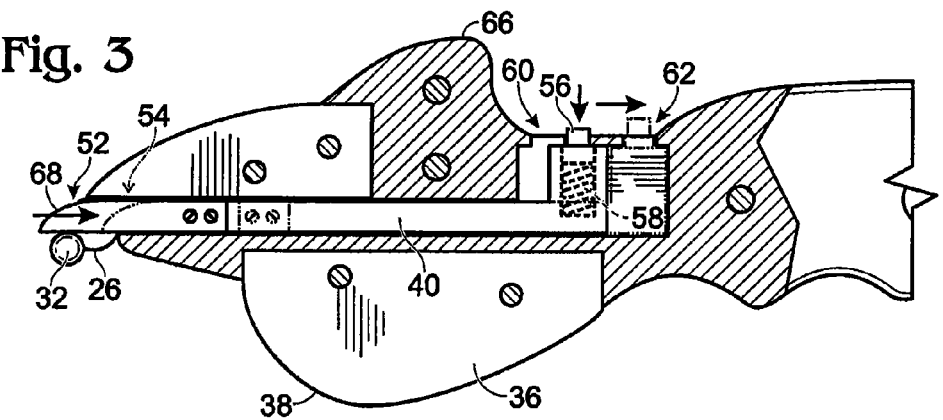

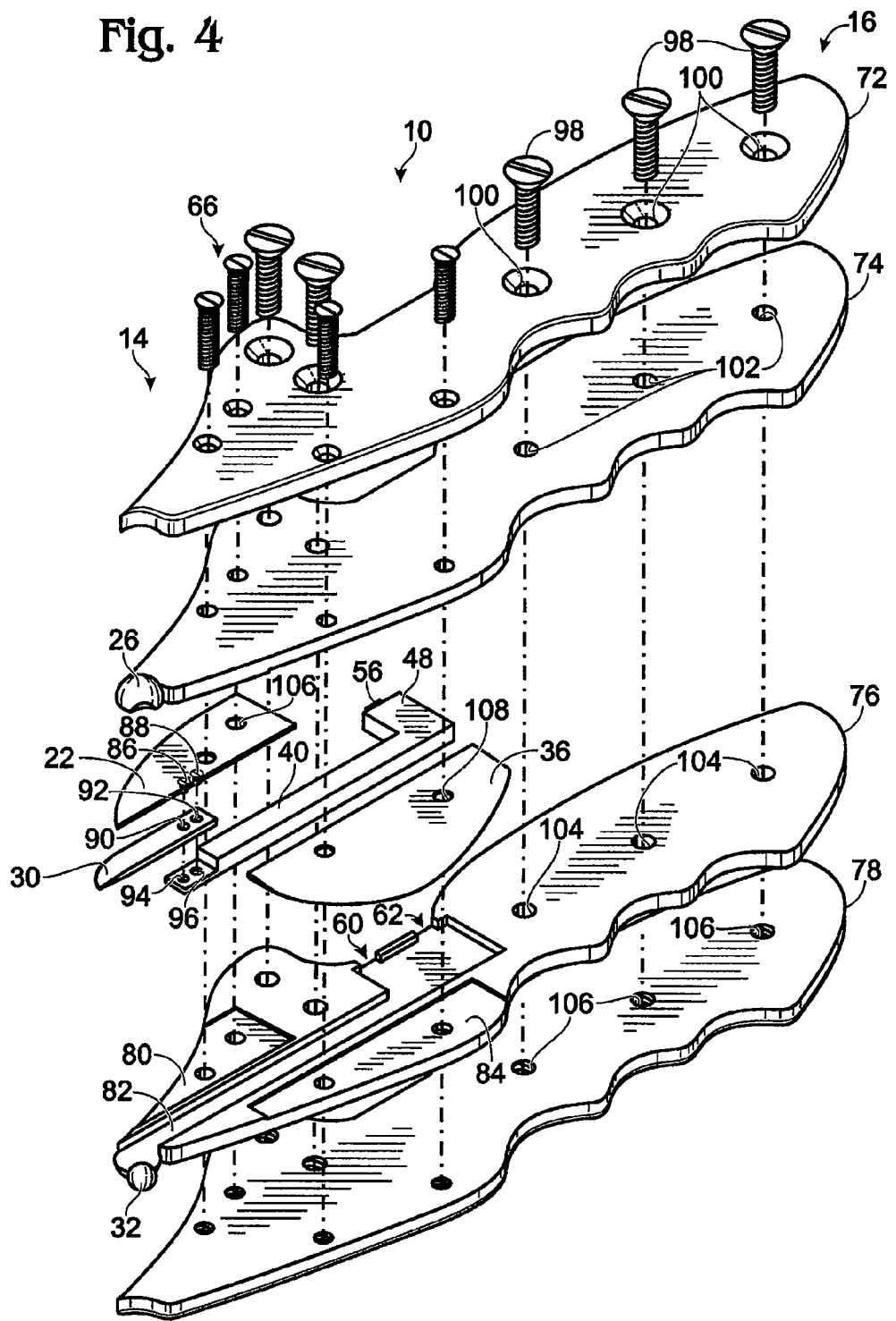

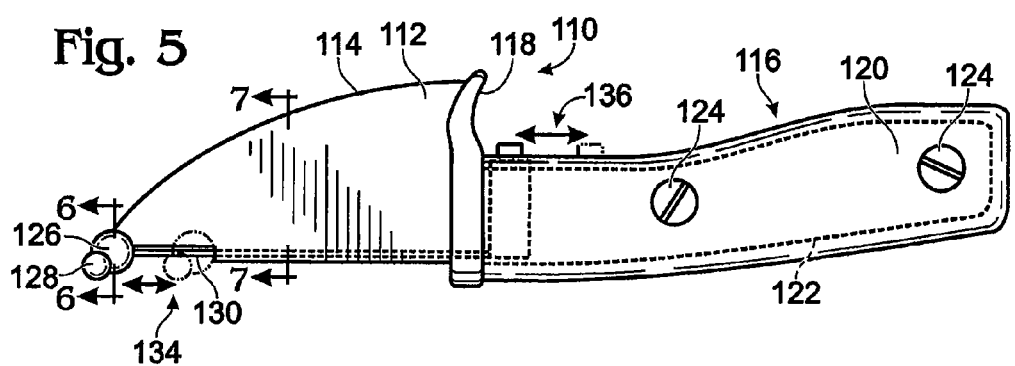
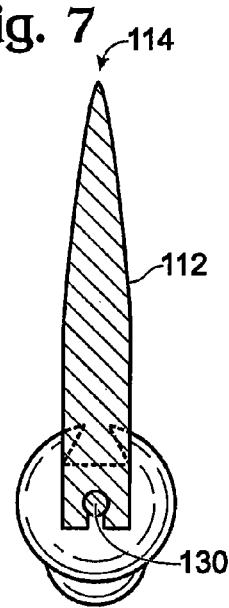
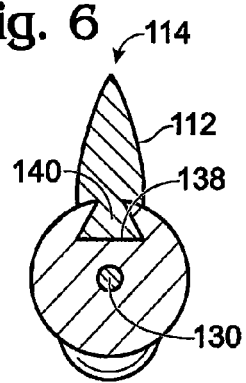

SKINNING KNIFE

This application is a divisional of U.S. patent application Ser. No. 12/142,699 filed on Jun. 19, 2008 now U.S. Pat. No. 8,152,606, which is hereby incorporated by reference in its entirety.

BACKGROUND OF THE INVENTION

1. Field of the Invention

This invention relates generally to knives for removing a first, covering material from a second, underlying material and particularly to knives for removing the hide from the musculature of a dead animal.

2. Description of the Related Art

Once an animal has been killed in a hunt it is ordinarily necessary to field dress and skin the animal. Skinning involves removing the hide of the animal from the musculature, or meat, of the animal with minimal damage to the meat, which is a challenging task.

Various tools have been devised to assist a hunter in skinning an animal that has been killed in hunting. Generally, the idea is to slit the hide and lift it from the meat without damaging the meat. One such tool is shown in Montgomery U.S. Pat. No. 4,607,432, which employs an arm having a spreading member at one end and that is pivotally attached to a knife at the other end so that the spreading member may be placed under the tip of the knife blade to lift the hide off the meat as the hide is slit. However, this device can be awkward to use because of the wide-swinging arm and the spreading member includes fairly narrow walls that concentrate force on the meat. Another such tool is shown in Crist U.S. Pat. No. 4,937,941. In this case, a spreading member fits over the tip of the knife and is held in place by a strap. However, this too may be awkward to use because the spreading member and strap hang loosely when the spreading member is not attached to the tip and, when the spreading member is attached to the tip, it covers a portion of the blade that is most useful in slitting the hide.

It has been found that there is a need for a better skinning knife that provides a more effective and convenient to use spreading member, and is more versatile in its function.

BRIEF SUMMARY OF THE INVENTION

The present invention meets the aforementioned need by providing a skinning knife, comprising a handle, having a forward portion, a grip portion disposed behind the forward portion, an upper portion and a lower portion; a slitting blade disposed at the forward portion and having an upwardly- and forwardly-directed cutting edge so as to cut the animal hide, or other material, encountered as the knife is thrust forwardly; a first spreading member disposed at the forward most position of the forward portion so as to spread apart two portions of hide or other material that have been separated by the slitting blade as the knife is thrust forwardly, the spreading member having a three-dimensional forwardly convex surface for engaging and spreading the two portions of material; and a retractable punch blade disposed at least partially in the forward portion beneath the slitting blade for opening a hole in the first hide or other material when the knife is thrust forwardly, the punch blade having a forward end and a rearward end, the forward end having a cutting edge, the first spreading member having a slot therein for receiving the punch blade, and the handle having a punch blade actuation mechanism for selectively moving the punch blade forwardly through the slot in the first spreading member and in front thereof and moving the punch blade rearwardly through said slot so as not to protrude forwardly beyond the forwardly convex surface of the first spreading member. The invention may also provide a second spreading member disposed below and forward of the first spreading member, the second spreading member also having a three-dimensional forwardly convex surface, or the two convex surfaces may be provided by a single spreading member. The invention may also be further provided with a downwardly directed skinning blade for separating the hide of an animal from the meat.

It is to be understood that this summary is provided as a means for generally determining what follows in the drawings and detailed description, and is not intended to limit the scope of the invention. Objects, features and advantages of the invention will be readily understood upon consideration of the following detailed description taken in conjunction with the accompanying drawings.

BRIEF DESCRIPTION OF THE DRAWINGS

FIG. 1 shows a side view of a preferred embodiment of a skinning knife according to the invention.

FIG. 2 shows a side view of the embodiment of FIG. 1 with a forward portion partially cut away to reveal the interior of the skinning knife with a latch in a forward position.

FIG. 3 shows a side view of the embodiment of FIG. 1 with a forward portion partially cut away to reveal the interior of the skinning knife with the latch in a rearward position.

FIG. 4 shows an exploded view of the embodiment of FIG. 1.

FIG. 5 shows a side view of an alternative embodiment of a skinning knife according to the invention.

FIG. 6 shows a section of the embodiment of a skinning knife according to FIG. 5, taken along line 6-6 thereof.

FIG. 7 shows a section of the embodiment of a skinning knife according to FIG. 5 taken along line 7-7 thereof.

DETAILED DESCRIPTION OF ILLUSTRATIVE EMBODIMENTS

In the following description many details are set forth to provide an understanding of the disclosed embodiments of the invention. However, upon reviewing this disclosure, it will become apparent to one skilled in the art that not all of the disclosed details may be required to practice the claimed invention and that alternative embodiments might be constructed without departing from the principles of the invention.

In general, a skinning knife according the present invention is especially adapted to remove the hide from an animal that has been killed in a hunt. However, the attributes of a knife according to the invention also enable it to be used for other purposes such as, for example, cutting through a single layer of carpet on a roll of carpet, so the terms in the specification and claims should not be construed as limiting the applications covered by the invention.

Referring first to FIG. 1, a preferred embodiment of a skinning knife 10 according to the present invention comprises a handle 12, having a forward portion 14, a grip portion 16 disposed behind the forward portion, an upper portion 18, and a lower portion 20. A slitting blade 22 is disposed at the forward portion of the handle. Preferably, the slitting blade has an upwardly- and forwardly-directed cutting edge 24 so as to cut material encountered as the knife is thrust forward. A first spreading member 26 is disposed at the forward most position of the forward portion of the handle so as to spread apart two portions of a first material 28 that have been separated by the slitting blade as the knife is thrust forwardly. A retractable punch blade 30 is disposed at least partially in the forward portion of the handle beneath the slitting blade for opening a hole in the first material when the knife is thrust forwardly. A smaller, second spreading member 32 is disposed below and forward of the first spreading member so as to enter a slit in advance of the first, larger spreading member. The knife further comprises a skinning blade 36 disposed below the lower portion 20 of the handle for removing the first material 28 from a second material 34 to which it is attached. Preferably, the skinning blade has an arcuate, convex, downwardly directed cutting edge 38.

Turning now to FIGS. 2 and 3, which show the front portion of the handle partially cut away, the knife further comprises an actuation shaft 40 having a forward end 42 attached to a rearward end 44 of the punch blade 30, and a rearward end 46, including an actuation member 48, the actuation shaft being adapted to move said punch blade forwardly and rearwardly. Preferably, the actuation member 48 comprises a latch 50 that allows the punch blade 30 to be locked in either of a forward position 52 or a rearward position 54. Referring particularly to FIG. 3, preferably the latch comprises a thumb tab 56 held outwardly by a spring 58, a forward aperture 60 for receiving the thumb tab to lock the punch blade in the forward position, and a rearward aperture 62 for receiving the thumb tab to lock the punch blade in the rearward position.

The handle 12 preferably further includes finger indentations 64 along the lower portion for gripping the handle, and a hand guard 66 rearward of the slitting blade 22 on the upper portion 18 of the handle to prevent a user's hand from slipping forward onto the slitting blade 22.

For reasons that will be better understood from the description below of the use of the knife, the first material spreading member 26 has a three-dimensional forwardly convex surface for engaging and spreading said two portions of material. More specifically, the first spreading member preferably has a substantially spherical shape. Similarly, the second spreading member 32 has a three-dimensional forwardly convex surface, preferably a substantially spherical surface. Preferably, the second spreading member 32 is somewhat smaller than the first spreading member 26. In the use of the term "substantially spherical" it is to be understood that neither the first nor the second spreading member is necessarily a complete sphere, or even exactly spherical in shape, the term merely being a workable description approximating the preferred shape. Moreover, both the first spreading member and the second spreading member may have other shapes, such as a conical shape, without departing from the principles of the invention. Further, the features of both the first spreading member and the second spreading member could be combined into a single, first spreading member without departing from the principles of the invention.

The use of the skinning knife can now be understood in light of the foregoing description. In hunting, the first material 28 is the hide of an animal that has been killed and the second material 34 is the musculature, or meat, of the animal. To remove the hide from the meat, or "skin" the animal, the punch blade 30 is moved to and locked in its forward position 52. The knife is then thrust into the hide such that the punch blade can cut, or punch, a small starter hole in the hide. Preferably, the punch blade has a cutting edge 68 that is upwardly- and forwardly-directed so as to cut material as the knife is thrust forwardly and pulled upwardly. The punch blade allows the user to open a hole large enough for the second spreading member 32. The user can then open up a hole 70 large enough to insert the first spreading member 26 and the slitting blade 22.

Once the first spreading member and the slitting knife are inserted into the hole 70, the punch blade 30 can be retracted. Then, the slitting blade is used to cut through the hide. As the knife is thrust through the hide, the spreading members separate the hide from the meat. After a lengthy slit has been made in the hide, the animal can then be skinned using the skinning blade 36 to free the hide from the meat and separate the hide from the meat.

The detailed structure and construction of a preferred embodiment of the skinning knife can be understood by reference to FIG. 4. In the preferred structure the handle comprises a sandwich of four parts: a first cover grip 72, a first inner plate 74, a second inner plate 76, and a second cover grip 78. The second inner plate 76 has a first cavity 80 for receiving the slitting blade 22, a second cavity 82 for receiving the punch blade 30 and actuation shaft 40, and a third cavity 84 for receiving the skinning blade 36. The second cavity 82 also forms the forward aperture 60 and rearward aperture 62 for receiving the thumb tab 56. The punch blade 30 is attached to the actuation shaft 40 by screws 86 and 88, which fit through respective apertures 90 and 92 in the punch blade and engage threaded apertures 94 and 96 in the actuation shaft 40. The entire assembly is then held together by a plurality of screws 98 that fit through respective apertures 100, 102, and 104 in the first cover grip 72, first inner plate 74 and the second inner plate 76, respectively, and engage threaded apertures 100 in the second cover grip 78. In some cases screws 98 also fit through apertures 106 and 108 in the slitting blade 22 and skinning blade 36, respectively. Preferably, the slitting blade, punch blade and skinning blade are made of steel, while the rest of the parts may be made of a lighter weight but sturdy material such as, for example, aluminum.

A second embodiment of a skinning knife 110 according to the present invention is shown in FIGS. 5, 6 and 7. In this case there is only one multi-purpose blade 112 that has an upwardly- and forwardly-directed cutting edge 114 so as to cut material encountered as the knife is thrust forward. The multi-purpose blade 112 is attached to a handle 116, with a hand guard 118 disposed there between. The handle has a first outer grip 120 and a second, mirror image outer grip (not shown) which cover a blade shank 122 and are attached to the shank by screw 124.

This embodiment also has a first spreading member 126 and a second spreading member 128. However, in this case, the two spreading members are attached to an actuation shaft 130 that is used to place the spreading members at the forward most tip 132 of the knife, or retract the spreading members to a rearward position 134. The spreading members may be locked in place by a thumb tab assembly 136 like that of the first embodiment. In addition, the first spreading member has a groove 138 therein for receiving a tongue 140 on the bottom of the multi-purpose blade so as to guide and position the first and second spreading members. As in the first embodiment, the features of the first spreading member and the second spreading member could be combined into a single, first spreading member without departing from the principles of the invention.

In use of the second skinning knife embodiment 110, the spreading members are initially retracted so that the tip of the multi-purpose blade can be used to punch a hole in the hide of an animal that has been sacrificed. Then, the spreading members are moved to their forward most position so that, as the blade is used to slit the hide, the two separated parts of the hide are spread. Finally, when a sufficiently long slit has been made in the hide, the spreading members are again retracted and the multi-purpose blade is used to separate the hide from the meat.

The terms and expressions that have been employed in the foregoing specification are used therein as terms of description and not of limitation, and there is no intention, in the uses of such terms and expressions, to exclude equivalents of the features shown and described or portions thereof, it being recognized that the scope of the invention is defined and limited only by the claims which follow.

What is claimed is:

1. A skinning knife, comprising:
   a handle, having a forward portion, a grip portion disposed behind said forward portion, an upper portion and a lower portion;
   a slitting blade disposed at said forward portion and having an upwardly- and forwardly-directed cutting edge so as to cut material encountered as the knife is thrust forwardly;
   a first spreading member disposed at the forward most position of said forward portion so as to spread apart two portions of a first material that have been separated by said slitting blade as the knife is thrust forwardly, said spreading member having a three-dimensional forwardly convex surface for engaging and spreading said two portions of material; and
   a retractable punch blade disposed at least partially in said forward portion beneath said slitting blade for opening a hole in said first material when said knife is thrust forwardly, said punch blade having a forward end and a rearward end, said forward end having a cutting edge, said first spreading member having a slot therein for receiving said punch blade, and said handle having a punch blade actuation mechanism for selectively moving said punch blade forwardly through said slot in said first spreading member and in front thereof and moving said punch blade rearwardly through said slot so as not to protrude forwardly beyond said forwardly convex surface of said first spreading member.

2. The skinning knife of claim 1, wherein said surface of said first spreading member has a substantially spherical shape.

3. The skinning knife of claim 1, wherein said surface of said first spreading member has a substantially conical shape.

4. The skinning knife of claim 1, wherein said cutting edge of said punch blade is upwardly- as well as forwardly-directed so as to cut material as the knife is thrust upwardly.

5. The skinning knife of claim 4, further comprising an actuation shaft having a forward end attached to said rearward end of said punch blade and a rearward end including an actuation member, said actuation shaft being adapted to move said punch blade forwardly and rearwardly.

6. The skinning knife of claim 5, wherein said actuation member comprises a latch that allows said punch blade to be locked in either of a forward position or a rearward position.

7. The skinning knife of claim 6, wherein said latch comprises a spring-loaded thumb tab, a forward aperture for receiving said thumb tab, and a rearward aperture for receiving said thumb tab.

8. The skinning knife of claim 4, further comprising a second spreading member disposed below and forward of said first spreading member, said second spreading member having a three-dimensional forwardly convex surface.

9. The skinning knife of claim 1, further comprising a second spreading member disposed below and forward of said first spreading member, said second spreading member having a three-dimensional forwardly convex surface.

10. Said skinning knife of claim 9, wherein said surface of said second spreading member has a substantially spherical shape.

11. The skinning knife of claim 9, wherein said surface of said second spreading member has a substantially conical shaped.

12. The skinning knife of claim 9, wherein said cutting edge of said punch blade is upwardly- as well as forwardly-directed so as to cut material as the knife is thrust upwardly.

13. The skinning knife of claim 12, further comprising an actuation shaft having a forward end attached to said rearward end of said punch blade and a rearward end including an actuation member, said actuation shaft being adapted to move said punch blade forwardly and rearwardly.

14. The skinning knife of claim 13, wherein said actuation member comprises a latch that allows said punch blade to be locked in either of a forward position or a rearward position.

15. The skinning knife of claim 14, wherein said latch comprises a spring-loaded thumb tab, a forward aperture for receiving said thumb tab, and a rearward aperture for receiving said thumb tab.

16. The skinning knife of claim 1, further comprising a skinning blade disposed below said lower portion of said handle for removing said first material from a second material to which it is attached.

17. The skinning knife of claim 16, wherein said skinning blade has an arcuate, convex, downwardly directed cutting edge.

18. The skinning knife of claim 17, further comprising a second spreading member disposed below and forward of said first material spreading member, said second spreading member having a three-dimensional forwardly convex surface.

19. The skinning knife of claim 18, wherein said cutting edge of said punch blade is upwardly- as well as forwardly-directed so as to cut material as the knife is thrust upwardly.

20. The skinning knife of claim 19, further comprising an actuation shaft having a forward end attached to said rearward end of said punch blade and a rearward end including an actuation member, said actuation shaft being adapted to move said punch blade forwardly and rearwardly.

21. The skinning knife of claim 20, wherein said actuation member comprises a latch that allows said punch blade to be locked in either of a forward position or a rearward position.

22. The skinning knife of claim 21, wherein said latch comprises a spring-loaded thumb tab, a forward aperture for receiving said thumb tab, and a rearward aperture for receiving said thumb tab.

23. The skinning knife of claim 1, further comprising a hand guard disposed rearward of said slitting blade on the upper portion of said handle.

24. The skinning knife of claim 1, wherein said first spreading member includes a first three-dimensional forwardly convex surface and a second three-dimensional forwardly convex surface.

25. A skinning knife, comprising:
   a handle, having a forward portion, a grip portion disposed behind said forward portion, an upper portion and a lower portion;
   a slitting blade disposed at said forward portion and having an upwardly- and forwardly-directed cutting edge so as to cut material encountered as the knife is thrust forwardly;
   a first retractable spreading member for spreading apart two portions of a first material that have been separated by said slitting blade as the knife is thrust forwardly, said spreading member having a three-dimensional forwardly convex surface for engaging and spreading said two portions of material; and an actuation mechanism for selectively moving said first spreading member forwardly to the forward most position of said slitting blade and rearwardly to a retracted position beneath said blade.

26. The skinning knife of claim 25, further comprising a second spreading member disposed below and forward of said first spreading member, said second spreading member having a three-dimensional forwardly convex surface.

27. The skinning knife of claim 26, wherein said first material spreading member has a substantially spherical shape.

28. The skinning knife of claim 27, wherein said second material spreading member has a substantially spherical shape.

29. The skinning knife of claim 28, wherein said first spreading member includes a first three-dimensional forwardly convex surface and a second three-dimensional forwardly convex surface.

* * * * *